(No Model.)

G. R. ELLIOTT.
SPEED GOVERNOR FOR PARCEL CARRIERS IN STORES.

No. 284,954.      Patented Sept. 11, 1883.

Witnesses.
Edward C. Ellis.
Leo. Duffy.

Inventor
Gilbert R. Elliott
per O. E. Duffy
Atty

United States Patent Office.

GILBERT R. ELLIOTT, OF BOSTON, MASSACHUSETTS, ASSIGNOR TO THE CONTINENTAL CASH CAR COMPANY, OF BALTIMORE, MARYLAND.

SPEED-GOVERNOR FOR PARCEL-CARRIERS IN STORES.

SPECIFICATION forming part of Letters Patent No. 284,954, dated September 11, 1883.

Application filed August 18, 1883. (No model.)

*To all whom it may concern:*

Be it known that I, GILBERT RUGGLES ELLIOTT, of Boston, in the county of Suffolk and State of Massachusetts, have invented a new and useful Speed-Governor for Parcel-Carriers in Stores, of which the following is a specification.

The object of my invention is to provide means for preventing those parcel-carriers used on elevated ways in stores, and which are propelled by gravity or by a push of the hand, from acquiring too great a speed.

My invention consists in the combination, with the wheel of a parcel-carrier, of a brake-block yieldingly attached to the wheel or its axle, so that should the carrier exceed a desired speed the brake-block will be thrown out by centrifugal force, and by coming in contact with a fixed surface bring the speed of the carrier to the desired rate, as hereinafter fully described.

Figure 1:
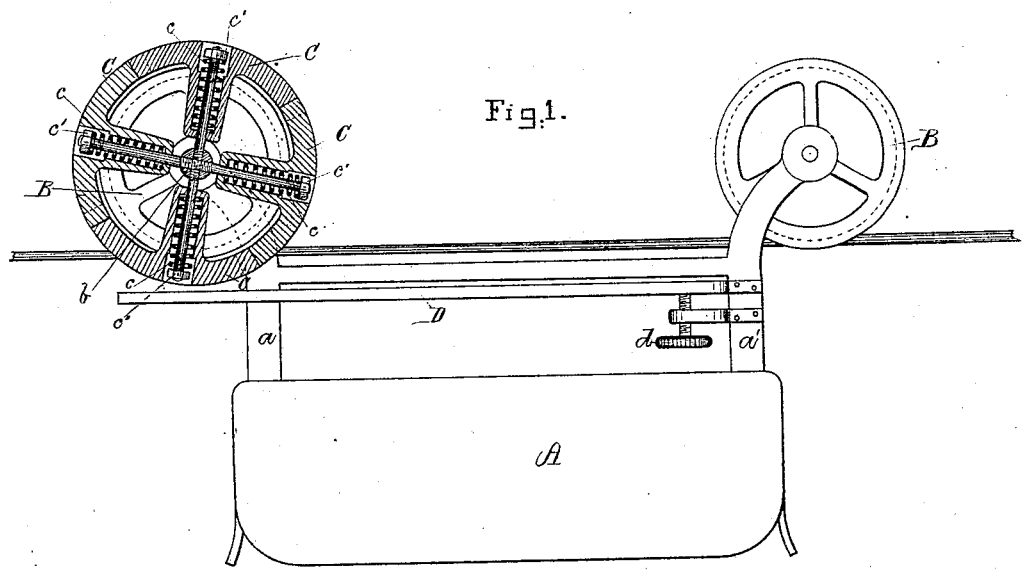
Figure 2:
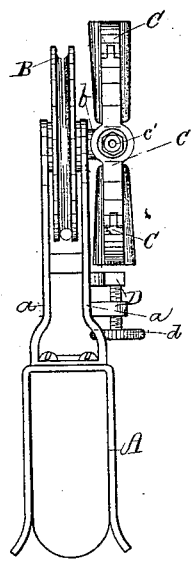
Figure 3:
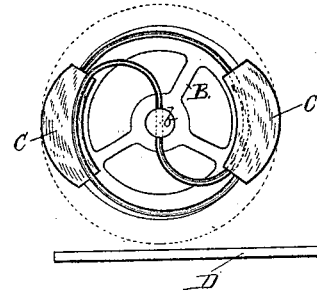
Figure 4:
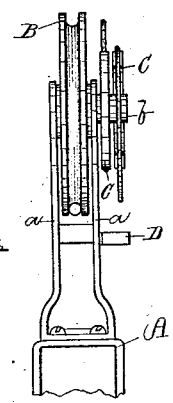

In the accompanying drawings, which illustrate a parcel-carrier with speed-governors attached in accordance with my invention, Figure 1 is a side elevation, partly in section. Fig. 2 is an end elevation, and Figs. 3 and 4 show another way of attaching the brake-blocks.

In many of the elevated ways now so largely used in stores for transporting parcels the parcel-carrier is propelled by gravity on inclined ways or by a push of the hand on level ways. On the inclined ways it has been found that some of the carriers run more easily than others, and that all of them, when first oiled, run faster than at other times, and on level ways for the same reasons, and also on account of the varying weight of the loads, the push given to propel the carrier is at times stronger than necessary. It therefore often happens that the speed of the carrier is so great that it strikes the arresting-stop with sufficient force to materially injure the carrier and the entire structure. With my improved governor the speed of the carrier can never exceed a rate determined by the adjustment of its parts.

A is a parcel-carrier of the usual construction, supported by arms $a\ a'$, suspended from the axles of the wheels B B'. The axle $b$ of one wheel, B, projects beyond the arm $a$ to receive the speed-governor.

The speed-governor consists of brake-blocks C, of a suitable weight, held by springs $c$, and so connected with the axle $b$ as to revolve with it. The springs $c$ in Fig. 1 are adapted to be adjusted by means of the nuts $c'$, so as to prevent the blocks C from being thrown out by centrifugal force, until the speed of the carrier exceeds a desired rate. As soon, however, as this rate of speed is exceeded, the centrifugal force overcomes the resistance of the springs $c$, and the blocks C are thrown out and come in contact with the surface of a brake, D, secured to the carrier and adjustable by means of a screw, $d$, toward or from the blocks C.

By means of the adjustments above mentioned, (or by that of the brake D alone for the device shown in Fig. 3,) the speed of the car can be regulated with the greatest nicety. It is evident that the centrifugal force created by a speed greater than that desired will overcome the resistance of the springs and cause the brake-blocks to come in contact with the brake D, retarding the wheel B and reducing the speed of the carrier. When the speed is thus reduced, the springs overcome the centrifugal force and withdraw the brake-blocks, allowing the carrier to proceed unobstructedly so long as its speed remains within the desired limits.

I claim as my invention—

In a parcel-carrier for stores, the combination, with a wheel of the carrier, of brake-blocks yieldingly attached thereto and a braking-surface on the carrier, against which the brake-blocks are thrown by centrifugal force when the speed of the carrier exceeds a desired limit, substantially as and for the purpose set forth.

GILBERT R. ELLIOTT.

Witnesses:
   G. B. MAYNADIER,
   JOHN R. SNOW.